(12) United States Patent
Gottanka et al.

(10) Patent No.: US 11,749,925 B2
(45) Date of Patent: Sep. 5, 2023

(54) ASSEMBLED ELECTRICAL CABLE, METHOD FOR ASSEMBLING AN ELECTRICAL CABLE, AND ELECTRICAL PLUG CONNECTION

(71) Applicant: Rosenberger Hochfrequenztechnik GmbH & Co. KG, Fridolfing (DE)

(72) Inventors: Johann Gottanka, Marktl (DE); Maximilian Rolshausen, Traunstein (DE); Josef Liebhart, Obing (DE)

(73) Assignee: Rosenberger Hochfrequenztechnik Gmbh & Co. KG, Fridolfing (DE)

( * ) Notice: Subject to any disclaimer, the term of this patent is extended or adjusted under 35 U.S.C. 154(b) by 69 days.

(21) Appl. No.: 17/627,302

(22) PCT Filed: Jul. 14, 2020

(86) PCT No.: PCT/EP2020/069885
§ 371 (c)(1),
(2) Date: Jan. 14, 2022

(87) PCT Pub. No.: WO2021/009170
PCT Pub. Date: Jan. 21, 2021

(65) Prior Publication Data
US 2022/0247108 A1    Aug. 4, 2022

(30) Foreign Application Priority Data

Jul. 18, 2019  (EP) .................................... 19186890

(51) Int. Cl.
*H01R 13/00* (2006.01)
*H01R 11/12* (2006.01)
(Continued)

(52) U.S. Cl.
CPC ........... *H01R 13/005* (2013.01); *H01R 11/12* (2013.01); *H01R 13/025* (2013.01); *H01R 43/02* (2013.01)

(58) Field of Classification Search
CPC ...... H01R 13/12; H01R 13/025; H01R 13/53; H01R 13/523; H01R 13/5227
See application file for complete search history.

(56) References Cited

U.S. PATENT DOCUMENTS 4,161,012 A * 7/1979 Cunningham ............ H01T 4/08
                                                     361/127
5,114,357 A * 5/1992 Luzzi ................... H02G 15/103
                                                     439/805
(Continued)

FOREIGN PATENT DOCUMENTS

DE        19321310 A1   11/2000
EP        2081196 A2    7/2009
(Continued)

OTHER PUBLICATIONS

European Search Report dated Jan. 7, 2020.
(Continued)

*Primary Examiner* — Phuong Chi Thi Nguyen
(74) *Attorney, Agent, or Firm* — Randall Danskin P.S.

(57) ABSTRACT

The invention relates to an assembled electrical cable (1). The cable (1) has a cooling channel (2) extending along the center axis (M) of the cable (1) and at least one inner conductor (4) extending along the outer surface of the cooling channel (2). The cable (1) furthermore has a cable sheath (7) guiding the inner conductor (4) and the cooling channel (2) within itself and a contact element (9) for an electrical plug connector (10), wherein the contact element (9) is electrically and mechanically connected to at least one portion of the inner conductor (4) exposed from the cable sheath (7). According to the invention, the inner conductor (4) is integrally joined to the contact element (9) or is compacted in a planar manner in order to form the contact element (9).

18 Claims, 6 Drawing Sheets

(51) Int. Cl.
*H01R 13/02* (2006.01)
*H01R 43/02* (2006.01)

(56) References Cited

U.S. PATENT DOCUMENTS

| | | | |
|---|---|---|---|
| 5,170,330 A | 12/1992 | Dolbear | |
| 7,503,785 B2 * | 3/2009 | Stepniak | G01R 15/16 |
| | | | 439/187 |
| 7,958,631 B2 * | 6/2011 | Hughes | H02G 1/14 |
| | | | 29/857 |
| 9,385,493 B2 * | 7/2016 | Maroney | H01R 13/6315 |
| 9,728,307 B2 * | 8/2017 | Luzzi | H01C 7/12 |
| 9,887,477 B1 | 2/2018 | Reed | |

FOREIGN PATENT DOCUMENTS

| | | |
|---|---|---|
| GB | 974006 A | 11/1964 |
| WO | 2019/115026 A1 | 6/2019 |

OTHER PUBLICATIONS

International Search Report dated Sep. 17, 2020.
Office Action issued by the European Patent Office Action dated Jul. 7, 2022.

* cited by examiner

ASSEMBLED ELECTRICAL CABLE, METHOD FOR ASSEMBLING AN ELECTRICAL CABLE, AND ELECTRICAL PLUG CONNECTION

CROSS-REFERENCE TO RELATED APPLICATIONS

This US National Stage Non-Provisional Patent Application claims priority to earlier filed PCT Patent Application No. PCT/EP2020/069885 which was filed on 14 Jul. 2020, and also claims priority to earlier filed European Patent Application No. EP 19 186 890.0 which was filed on 18 Jul. 2019. The entire contents of both the aforementioned earlier filed PCT Patent Application and the aforementioned European Patent Application are both expressly and fully incorporated herein by this reference.

Pursuant to USPTO rules, this priority claim to earlier filed PCT Patent Application No. PCT/EP2020/069885 which was filed on 14 Jul. 2020, and earlier filed European Patent Application No. EP 19 186 890.0 which was filed on 18 Jul. 2019 are both also included in the Application Data Sheet (ADS) filed herewith.

TECHNICAL FIELD

The invention relates to an assembled electrical cable, having a cooling channel, at least one inner conductor, a cable sheath and a contact element for an electrical plug connector.

The invention also relates to an electrical plug connector with a housing module and at least one assembled electrical cable, having a cooling channel, at least one inner conductor, a cable sheath and a contact element for an electrical plug connector.

The invention additionally relates to an electrical plug connection, having an electrical plug connector and an electrical mating plug connector connectable to the electrical plug connector.

The invention also relates to a method for assembling an electrical cable which has a cooling channel.

BACKGROUND

When assembling cables, ends of the assembled cables are generally connected to an electrical plug connector or at least to components or modules of an electrical plug connector. For example, within the scope of cable assembly, a contact element of the subsequent plug connector can be electrically and mechanically connected to an inner conductor of the cable and can then be mounted in a housing module of the plug connector. The finished, assembled contact element can thus be used for the subsequent contacting with a mating contact element of a mating plug connector that is connectable to the plug connector.

A plug connectors or mating plug connector, can be a plug, a panel plug, a socket, a coupling or an adapter. The term "plug connector" or mating plug connector" used within the scope of the invention, and this disclosure, is representative for all variants.

High requirements are placed on the robustness and safety of the plug connections in particular for plug connectors and electrical cables for the automotive industry or for vehicles. The automotive industry and suppliers thereto face large challenges in particular in respect of electromobility, since high electrical powers must be transferred into the vehicles via the cables, or via the plug connections. The thermal load and the resultant waste heat that accompanies the high current flow is not insignificant.

In order to be able to dissipate the heat created in the cables and in the plug connections, high-voltage cables that are cooled intermittently can be used (so-called "Cool Harness" concept). In cables of this kind, a cooling channel is generally guided through the cable in a longitudinal direction and is connected to a cooling circuit and is passed through by a cooling liquid in order to transport the heat away. A cable of this kind is described, for example, in document DE 199 21 310 A1 from the same field.

The connection point between the cooled cable and the plug connector, however, is problematic. Since cooling can be necessary in this region as well, it is proposed in DE 199 21 310 A1 to firstly connect a cable shoe by means of a crimp sleeve to the inner conductor of the cable. The cable shoe is then penetrated by a threaded bolt and can be connected to the contact element of the high-voltage plug connector by means of the threaded bolt. Due to the bolted connection, a connection can also be made to a cooling chamber at the connection point to the contact element.

This known connection solution requires a relatively large number of components. The connection is also rigid due to the specific arrangement of the components and does not allow any flexible orientation between the high-voltage cable and the contact element of the plug connector. A certain flexibility may be desirable, however, in particular for tolerance compensation. A further demand placed on plug connectors for the automotive industry is that they must be producible cost-effectively in high numbers. The connection technology described in DE 199 21 310 A1 is suitable for this only to a limited extent.

In view of the known prior art, the problem addressed by the present invention is that of providing a cooled assembled electrical cable of which the inner conductor is connected to a contact element in a particularly advantageous way.

The present invention also addresses the problem of providing an electrical plug connector which has a cooled assembled electrical cable of which the inner conductor is connected to a contact element in a particularly advantageous way.

Lastly, the invention also addresses the problem of providing an electrical plug connection having an improved electrical plug connector, in particular for use in high-voltage technology.

The invention additionally addresses the problem of providing a method for assembling a cooled electrical cable, in which method an inner conductor of the cable can be connected to a contact element of a plug connector using simple means, and in particular also in a flexible manner for tolerance compensation.

The features described and disclosed herein and hereinafter relate to advantageous embodiments and variants of the invention.

An assembled electrical cable is provided, having a cooling channel extending along the center axis of the cable. The cable additionally has at least one inner conductor running along the outer surface of the cooling channel and a cable sheath guiding the inner conductor and the cooling channel within itself. The cable also has a contact element for an electrical plug connector, which contact element is electrically and mechanically connected to at least a portion of the inner conductor exposed from the cable sheath.

The contact element preferably has a flat geometry. The thickness of the contact element can be very significantly smaller than the width and the length of the contact element. A plate-like contact element is preferably provided.

An elongate contact element can preferably be provided in addition. The length of the contact element along a longitudinal axis can be greater than its width.

The electrical cable can be, in particular, a high-voltage cable or a high-voltage line for transmitting high currents, for example with voltages of 1,500 volts or more.

The electrical cable according to the invention can be used particularly advantageously in electrically driven vehicles, for example in electric vehicles or hybrid vehicles.

The cross section of the cable can be, for example 10 mm$^2$ or more, preferably 50 mm$^2$ or more, for example also 100 mm$^2$ or more, 200 mm$^2$ or more, or 300 mm$^2$ or more.

The electrical cable can have, in principle, any number of inner conductors, for example one inner conductor, two inner conductors or more inner conductors, three inner conductors or more inner conductors, four inner conductors or more inner conductors, five inner conductors or more inner conductors. The invention is described hereinafter fundamentally on the basis of an electrical cable that has precisely one inner conductor. This is not understood to be limiting, however.

The one or more inner conductors of the cable can be arranged coaxially with the center axis of the cable. The one or more inner conductors can be distributed uniformly about the center axis of the cable.

The at least one inner conductor runs in some sections or fully over the outer surface of the cooling channel and thus contacts the cooling channel directly. In particular if the at least one inner conductor contacts the outer surface of the cooling channel directly, the heat created by the current flow can be dissipated in an advantageous way.

Due to the electrical cable cooled in accordance with the invention, further advantages can also be provided, besides the reduction of the amount of heat introduced into surrounding modules. For example, the cable cross-section can be reduced if necessary, and thus the weight of the cable can be reduced since the cooling can also reduce the electrical resistance of the cable.

The exposed portion of the inner conductor to which the contact element is connected can preferably be an end portion of the inner conductor or of one of the two ends of the inner conductor. In principle, however, the invention can also be suitable for connecting a contact element to an exposed, middle portion of the inner conductor.

It is provided in accordance with the invention that the inner conductor is connected to the contact element in an integrally bonded manner or is compacted in a plate-like manner in order to form the contact element.

An advantageous contacting of a cooled assembled electrical cable, in particular a high-voltage cable, can thus be provided in accordance with the invention.

In particular, within the scope of the invention it is possible to dispense with a bolted connection, riveted connection or crimped connection between the inner conductor and the contact element. It can be provided that the inner conductor and the contact element are not connected to one another in a frictionally engaged manner. It can be provided that the inner conductor and the contact element are not connected to one another in an interlocking manner. In particular, it can be provided that the inner conductor is connected to the contact element exclusively in an integrally bonded manner.

The inner conductor can be connected, in particular non-releasably, to the contact element, whereby the inner conductor can no longer be removed from the contact element non-destructively.

It is a particular advantage of the invention that the contact element can be oriented and/or positioned in a flexible manner relative to the electrical cable.

For example, a tilting of the contact element about its longitudinal axis can be predefined or compensated.

Furthermore, for example, an orientation of the longitudinal axis of the contact element relative to the center axis of the cable can be predefined or compensated. For example, the longitudinal axis of the contact element can be oriented parallel to the center axis of the cable, oriented orthogonally to the center axis of the cable, or oriented in accordance with another angle to the center axis of the cable.

Lastly, a distance for example between the contact element and the cable or the cooling channel can be predefined or compensated.

The position of a front end of the contact element, which is intended for connection to a mating contact element of a mating plug connector, can be fixed or compensated relatively flexibly along the center axis of the cable.

In an advantageous refinement of the invention it can be provided that the cooling channel runs coaxially with the center axis of the cable.

The concentric design of the cable and the achievable cooling effect can be improved by a coaxial arrangement of the cooling channel.

The cooling channel is preferably formed from an electrically non-conductive material, for example only, and not limited to, from a plastic.

The cooling channel is particularly preferably formed in the manner of a hose, in order to influence the flexibility of the cable to the smallest extent possible. However, a rigid cooling channel in the form of a pipe can also be provided, depending on the application.

The cooling channel can be formed for example in the manner of a pneumatic hose or smooth tube. The cooling channel, however, can also be formed as an endless profile with an inner and/or outer profile.

In accordance with a refinement of the invention, it can be provided that the inner conductor is formed as a stranded wire consisting of a plurality of individual wires which are distributed individually, or in groups, along the circumference of the cooling channel.

In particular, the use of an inner conductor which is formed as a stranded wire is suitable in accordance with the invention for an integrally bonded connection or the formation of the contact element. In principle, however, the invention can also be suitable for use with an inner conductor which is formed merely from a single wire.

In particular, a uniform distribution of a plurality of inner conductors, or the individual wires of at least one inner conductor, formed as a stranded wire over the circumference of the cooling channel can additionally also contribute to the mechanical stability of the cable.

It can be provided that the cooling channel or an inner conductor guide running over the cooling channel is profiled on an outer surface and in particular has furrows, grooves and/or ribs in order to keep one or more wires of one or more inner conductors at a distance from one another along the circumference of the cooling channel. In principle, however, the outer surface of the cooling channel can also be smooth. A profiling of the cooling channel or a profiled inner conductor guide, however, can be advantageous in particular in order to distribute the wires of the one or more outer conductors uniformly along the circumference of the cooling channel.

In accordance with a refinement of the invention it can be provided that the individual wires of the stranded wire are amalgamated at an exit point from the cable sheath.

The individual wires can be amalgamated or bundled in particular in an angular segment, or a circle segment.

In order to fasten the contact element to the inner conductor, or to form the contact element from the inner conductor, it can be advantageous to amalgamate or to bundle a majority of or all individual wires of a stranded wire, in particular in an angular segment or circle segment with a center point angle of 180° or less, preferably 90° or less, particularly preferably 60° or less, for example 45° or less, 30° or less, or also 20° or less.

The inventors have recognized that the flexibility of the connection of the inner conductor to the contact element, in particular for tolerance compensation, can be improved if the individual wires are firstly amalgamated at their exit point from the cable sheath.

In a refinement of the invention it can be provided that the inner conductor is connected in an integrally bonded manner to a surface of the contact element facing away from the cooling channel.

Since the inner conductor is connected to the surface of the contact element facing away from the cooling channel, the length of the inner conductor, in particular of the individual wires of a stranded wire, is additionally increased starting from the exit point from the cable sheath to the region of connection to the contact element. This can additionally improve the flexible orientation and/or arrangement of the contact element relative to the electrical cable.

Furthermore, the accessibility of the connection region of the contact element where the inner conductor is to be fastened can be improved during the assembly of the electrical cable, or the integrally bonded connection between inner conductor and contact element can be produced more easily if the inner conductor is connected to the surface of the contact element facing away from the cooling channel.

In a refinement of the invention it can be provided that the inner conductor is welded to the contact element, preferably press-welded, resistance-welded or fusion-welded, in order to form the integrally bonded connection.

Any integral bonding connection techniques are possible in principle. The connection between the inner conductor element and the contact element, however, is particularly preferably achieved by contact welding or resistance welding.

In order to further optimize the heat conductivity and at the same time also the weldability of the contact element, it can be provided to form the contact element preferably from brass. In principle, however, it can also be provided to produce the contact element from another material, for example only, and not limited to, from aluminum or in some cases also from gold (although this is not preferred due to the high costs).

In an advantageous refinement of the invention it can be provided that the inner conductor and/or the contact element is coated with a heat-conducting paste.

In order to improve further still the heat conductivity between the inner conductor and the contact element, in particular between individual wires of a stranded wire and the contact element, the inner conductor and/or the contact element can be coated or sheathed with a heat-conducting paste. The heat-conducting paste can penetrate very well into gaps between wires of the inner conductor and can thus lead to an improved dissipation of heat.

In an advantageous refinement of the invention it can be provided that the inner conductor is welded, preferably press-welded, resistance-welded or fusion-welded, in order to form the contact element.

An embodiment of this kind has proven to be particularly suitable for forming the contact element from the inner conductor, in particular from an inner conductor formed as a stranded wire.

A separate contact element can advantageously be omitted if the inner conductor itself forms the contact element.

For example, the individual wires of a stranded wire can be compacted and welded to one another to form the contact element.

By means of such a compacting or grouping of the individual wires of the stranded wire, air inclusions between the individual wires in the region of at most 10 vol. %, preferably at most 5 vol. %, and more preferably at most 3 vol. % can be realized.

In a refinement of the invention it can be provided that the contact element forms a terminal region, in particular with a centering bore (or another bore), for connection to a mating contact element of an electrical mating plug connector.

The terminal region is preferably formed at the end of the contact element remote from the region of connection of the inner conductor to the contact element (in relation to the longitudinal axis of the contact element).

For example, it can be provided that the separate contact element or the contact element formed and compacted from the inner conductor has a through-bore or a blind bore for receiving an elongate mating contact element, for example a sleeve-like, or pin-like, mating contact element.

In an advantageous refinement of the invention it can be provided that at least a portion of the contact element (or a portion of the surface of the contact element facing the cooling channel) bears directly against the outer surface of the cooling channel in order to produce a heat-conductive connection to the cooling channel.

Besides the improved cooling, an advantageous guidance of the cooling channel outside the cable can additionally be provided in this way.

It can also be provided, however, that the surface of the contact element facing the cooling channel is not connected to the cooling channel or is indirectly connected to the cooling channel via a further component (for example a connection element yet to be described hereinafter) arranged between the contact element and the cooling channel.

In an advantageous refinement of the invention it can be provided that the contact element has, on its surface facing the cooling channel, a contact face, in particular an indentation complementary to the cooling channel or another indentation, which surrounds the cooling channel at its outer circumference, at least along a circumferential portion.

The contact face can form a guide for the cooling channel in order to guide the cooling channel at least in some sections in order to increase the contact area between the cooling channel and the contact element.

The contact face can emulate the external geometry, in particular a radius, of the cooling channel in negative form in order to receive the cooling channel with as little play as possible.

For example, the contact element connected in an integrally bonded manner to the inner conductor can have, on the surface facing the cooling channel, a trough-like, or furrow-like, indentation for guiding the cooling channel.

The contact element formed from the inner conductor can be compacted in such a way that a trough-like, or furrow-like, indentation is created.

A contact face can also be formed in the surface of the contact element firstly by a corresponding post-processing of the contact element.

In an advantageous refinement of the invention it can be provided that a connection element is arranged between the contact element and the cooling channel and bears against the contact element and against the cooling channel in order to produce a heat-conductive connection between the cooling channel and the contact element.

The connection element is preferably formed from a good heat-conductive material in order to further improve the heat transfer between the contact element and the cooling channel.

The connection element can preferably be formed from a plastic.

In an advantageous refinement of the invention it can be provided that the connection element has, on its surface facing the cooling channel, a contact face, in particular an indentation complementary to the cooling channel or another indentation, which surrounds the cooling channel at its outer circumference, at least along a circumferential portion.

Said contact face can be advantageous in order to increase the contact area of the connection element with the cooling channel and, if necessary, also in order to provide an improved guidance of the cooling channel outside the electrical cable.

For example, the contact face already described in respect of the contact element can also be realized for the connection element, in particular a contact face with a trough-like or furrow-like indentation.

It can preferably also be provided that the connection element encloses the cooling channel fully circumferentially, in particular in the region of the connection to the contact element. For this purpose, in particular a through-bore through the connection element can be provided.

The electrical cable can be formed as a shielded or unshielded cable. The use of a shielded cable can be advantageous in particular to improve the electromagnetic compatibility (EMC). In the case of a shielded electrical cable it can be provided that an outer conductor shield runs along the center axis of the cable (preferably coaxially with the center axis) between the cable sheath and the at least one inner conductor or the cooling channel. Furthermore, an insulator can be provided, which runs along the center axis of the cable (preferably coaxially with the center axis) and which is arranged between the outer conductor shield and the at least one inner conductor. If the inner conductor is exposed from the cable sheath for connection to the contact element or to form the contact element, the inner conductor should thus also be exposed from the insulator and the outer conductor shield. The outer conductor shield can then be electrically connected to a shielding of the plug connector or the contact region (interface) thereof, for example to a shield housing of the electrical plug connector.

The invention also relates to an electrical plug connector with a housing module and at least one assembled electrical cable. The electrical cable has a cooling channel extending along the center axis of the cable and at least one inner conductor running along the outer surface of the cooling channel. The electrical cable also has a cable sheath guiding the inner conductor and the cooling channel and a contact element for an electrical plug connector. The contact element is electrically and mechanically connected to at least a portion of the inner conductor exposed from the cable sheath. It is provided that the inner conductor is connected in an integrally bonded manner to the contact element or is compacted in a plate-like manner in order to form the contact element.

The housing module of the plug connector can be, in particular, a plastic housing, for example a one-part plastic housing or a multi-part plastic housing, which consists of an upper housing shell and a lower housing shell.

The housing module, or the plug connector, can additionally have ring seals, cable fixtures or strain relief components, termination caps and further plug connector components.

The housing module can be designed to receive at least one electrical cable assembled with the contact element. The housing module can be designed in particular to receive a single electrical cable assembled with the contact element or to receive precisely two electrical cables assembled with one contact element each. In principle, however, it can also be provided that the housing module is designed to receive three, four, five, six or even more assembled cables.

The plug connector according to the invention represents a component-minimized solution. In particular, bolted connections or crimped connections between the inner conductor and the contact element can be omitted.

The electrical plug connector is preferably designed as a high-voltage plug connector, in particular for use in an electrically driven vehicle. The electrical plug connector, however, is not limited to a specific plug connector type or to the use in a vehicle. Plug connections for transmitting high currents and voltages are particularly suitable, however, for use with the invention.

The invention also relates to an electrical plug connection having an electrical plug connector, in particular according to the descriptions provided hereinbefore and hereinafter, and to an electrical mating plug connector connectable to the electrical plug connector.

In particular, the plug connection according to the invention is particularly suitable for use in an electrically driven vehicle.

The term "vehicle" in this context describes any means of transport, in particular vehicles on land, on water or in the air, also including spacecraft.

The invention additionally also relates to a vehicle having at least one electrical plug connector with at least one assembled electrical cable according to the details provided above and hereinafter, and to a cooling device.

The cooling device can be designed to pump a coolant, in particular a fluid, very particularly preferably a liquid, through the cooling channel of the electrical cable.

The cooling device can advantageously be part of a cooling circuit of the vehicle that is provided anyway.

The invention also relates to a method for assembling an electrical cable which has a cooling channel extending along the center axis of the electrical cable, said method having at least the following method steps: (1) exposing an inner conductor of the cable, in at least a portion of the cable, from a cable sheath guiding the inner conductor within itself; (2) connecting the inner conductor to a contact element (separate from the inner conductor) in an integrally bonded manner or compacting the inner conductor in a plate-like manner to form a contact element which is in one part with the inner conductor.

The compacting of the inner conductor, in particular an inner conductor formed as a stranded wire having a plurality of individual wires, can lead to a dimensionally stable region and thus to the formation of a contact element. A separate contact element can therefore be omitted, thus saving further material.

In particular, however, the variant of the integrally bonded connection between the inner conductor and the contact element can also be advantageous in order to save material, in particular screws and/or crimp sleeves.

Within the scope of the method for assembling the electrical cable, it can also be provided to first produce the electrical cable. To this end, it can be provided, for example, to firstly twist the one inner conductor or the plurality of inner conductors, but in particular individual wires of an inner conductor formed as a stranded wire, around the cooling channel and then to extrude the cable sheath.

The cable to be assembled can be present in the form of a product sold in various length measurements, such as, but not limited to, by the meter. For example, it can thus be provided to trim the electrical cable to length in a defined manner before exposing the inner conductor.

It can be provided, following the integrally bonded connection of the inner conductor to the contact element or following the compacting of the inner conductor in a plate-like manner, to provide the contact element with an insulating protection against contact, which can prevent an accidental contacting of the contact element in the subsequent plug connector. The protection against contact can have a sleeve-like component with a through-bore, in order to provide a defined access in the plug connector to the contact element, where possible only for the corresponding mating contact element of the mating plug connector. The protection against contact, for example, can also be formed in one part with the previously described connection element.

Within the scope of the assembly method, it can also be provided to perform a zero cut of the inner conductor connected in an integrally bonded manner to the contact element, in order to produce a defined end of the inner conductor, in particular of the individual wires of a stranded wire.

Once the inner conductor has been exposed and before the integrally bonded connection or before the compaction of the inner conductor, it can also be provided, for example, to firstly fan out an inner conductor formed as a stranded wire having a plurality of individual wires. The fanned-out inner conductor can then be amalgamated or bundled in an angular segment.

The plug connection according to the invention or the assembly method according to the invention can be implemented particularly economically and is thus suitable in particular also in respect of mass manufacturing.

Features that have been described in conjunction with the electrical cable according to the invention are of course also practicable for the electrical plug connector, the electrical plug connection, the vehicle and the method—and vice versa. Furthermore, advantages that have already been mentioned in conjunction with the electrical cable according to the invention can also be understood based on the electrical plug connector, the electrical plug connection, the vehicle and the method—and vice versa.

In principle, advantages and features that relate to the integrally bonded connection of the inner conductor to the contact element can also be transferred to the inner conductor compacted in a plate-like manner (which forms the contact element itself).

It is noted in addition that terms such as "comprising", "having" or "with" do not rule out other features or steps. Furthermore, terms such as "a" or "the" which indicate a number of steps or features do not rule out a plurality of features or steps—and vice versa.

It is also noted that the presently described values and parameters include deviations or fluctuations of ±10% or less, preferably ±5% or less, more preferably ±1% or less, and very particularly preferably ±0.1% or less of the particular stated value or parameter, provided these deviations are not ruled out when implementing the invention in practice. The statement of ranges by start and end values also includes all the values and fractions included by the particular stated range, in particular the start and end values and any values in between.

Exemplary embodiments of the invention will be described in greater detail hereinafter with reference to the accompanying Figures.

The Figures each show preferred exemplary embodiments in which individual features of the present invention are shown in combination with one another. Features of an exemplary embodiment are also practicable separately from the other features of the same exemplary embodiment and can accordingly be readily combined with features of other exemplary embodiments by a person skilled in the art to form further expedient combinations and sub-combinations.

Functionally like elements are provided in the Figures with the same reference signs.

SUMMARY

Our Assembled Electrical Cable Method for Assembling an Electrical Cable, and Electrical Plug Connection generally provides an electrical cable (1) that defines a cooling channel (2); an inner conductor (4); a cable sheath (7); and a contact element (9).

A principal aspect of the present invention is an assembled electrical cable (1) having a cooling channel (2) extending along the center axis (M) of the cable (1); at least one inner conductor (4) running along the outer surface of the cooling channel (2); a cable sheath (7) guiding the inner conductor (4) and the cooling channel (2) within itself; and a contact element (9) for an electrical plug connector (10), which contact element is electrically and mechanically connected to at least a portion of the inner conductor (4) exposed from the cable sheath (7), characterized in that the inner conductor (4) is connected to the contact element (9) in an integrally bonded manner or is compacted in a plate-like manner in order to form the contact element (9).

A further aspect of the present invention is an assembled electrical cable (1), characterized in that the cooling channel (2) runs coaxially with the center axis (M) of the cable (1).

A further aspect of the present invention is an assembled electrical cable (1), characterized in that the inner conductor (4) is formed as a stranded wire formed from a plurality of individual wires which are distributed individually, or in groups, along the circumference of the cooling channel (2).

A further aspect of the present invention is an assembled electrical cable (1), characterized in that the individual wires of the stranded wire are amalgamated at their exit point (8) from the cable sheath (7).

A further aspect of the present invention is an assembled electrical cable (1), characterized in that the inner conductor (4) is connected in an integrally bonded manner to a surface 11 of the contact element (9) facing away from the cooling channel (2).

A further aspect of the present invention is an assembled electrical cable (1), characterized in that the inner conductor (4) is welded to the contact element (9), preferably press-welded, resistance-welded or fusion-welded, in order to form the integrally bonded connection.

A further aspect of the present invention is an assembled electrical cable (1), characterized in that the inner conductor (4) is welded, preferably press-welded resistance-welded or fusion-welded, in order to form the contact element (9).

A further aspect of the present invention is an assembled electrical cable (1), characterized in that the contact element (9) forms a connection region (12) in particular with a centering bore (15), for connection to a mating contact element (13) of an electrical mating plug connector (14).

A further aspect of the present invention is an assembled electrical cable (1), characterized in that at least a portion of the contact element (9) bears directly against the outer surface of the cooling channel (2) in order to produce a heat-conductive connection to the cooling channel (2).

A further aspect of the present invention is an assembled electrical cable (1), characterized in that a connection element (17) is arranged between the contact element (9) and the cooling channel (2) and bears against the contact element (9) and against the cooling channel (2) in order to produce a heat-conductive connection between the cooling channel (2) and the contact element (9).

A further aspect of the present invention is an assembled electrical cable (1), characterized in that the connection element (17), or the contact element (9) has, on its surface facing the cooling channel (2), a contact face, in particular an indentation complimentary to the cooling channel (2) or another indentation which surrounds the cooling channel (2) at its outer circumference at least along a circumferential portion.

A further aspect of the present invention is an assembled electrical cable (1), characterized in that the inner conductor (4) and/or the contact element (9) is coated with a heat-conducting paste.

A further, aspect of the present invention is an electrical plug connector (10) with a housing module (20) and with at least one assembled electrical cable (1), having a cooling channel (2) extending along the center axis (M) of the cable (1); at least one inner conductor (4) running along the outer surface of the cooling channel (2); a cable sheath (7) guiding the inner conductor (4) and the cooling channel (2) within itself; and a contact element (9) for an electrical plug connector (10), which contact element is electrically and mechanically connected to at least a portion of the inner conductor (4) exposed from the cable sheath (7), characterized in that the inner conductor (4) is connected to the contact element (9) in an integrally bonded manner or is compacted in a late-like manner in order to form the contact element (9).

A still further aspect of the present invention is an electrical plug connection (31), having an electrical plug connector (10) and an electrical mating plug connector (14) connectable to the electrical plug connector (10).

An even still further aspect of the present invention is a method for assembling an electrical cable (1) which has a cooling channel (2) extending along the center axis (M), the method having at least the following method steps: exposing an inner conductor (4) of the cable (1) in at least a portion of the cable (1), from a cable sheath (7), guiding the inner conductor (4 within itself; connecting the inner conductor (4) to a contact element (9) in an integrally bonded manner or compacting the inner conductor (4) in a plate-like manner to form a contact element (9) in one part with the inner conductor (4).

These and other aspects of the present invention are more fully set forth herein.

BRIEF DESCRIPTIONS OF THE FIGURES

The figures show schematically:

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
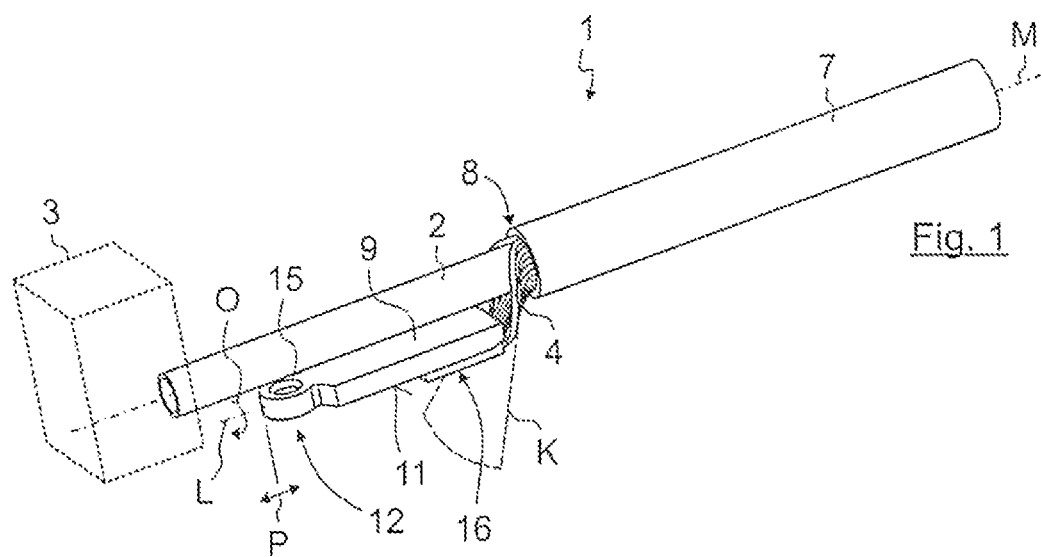
FIG. 1 is an assembled electrical cable with a cooling channel, an inner conductor, a cable sheath and a contact element according to a first exemplary embodiment, in a perspective view.
Figure 2:
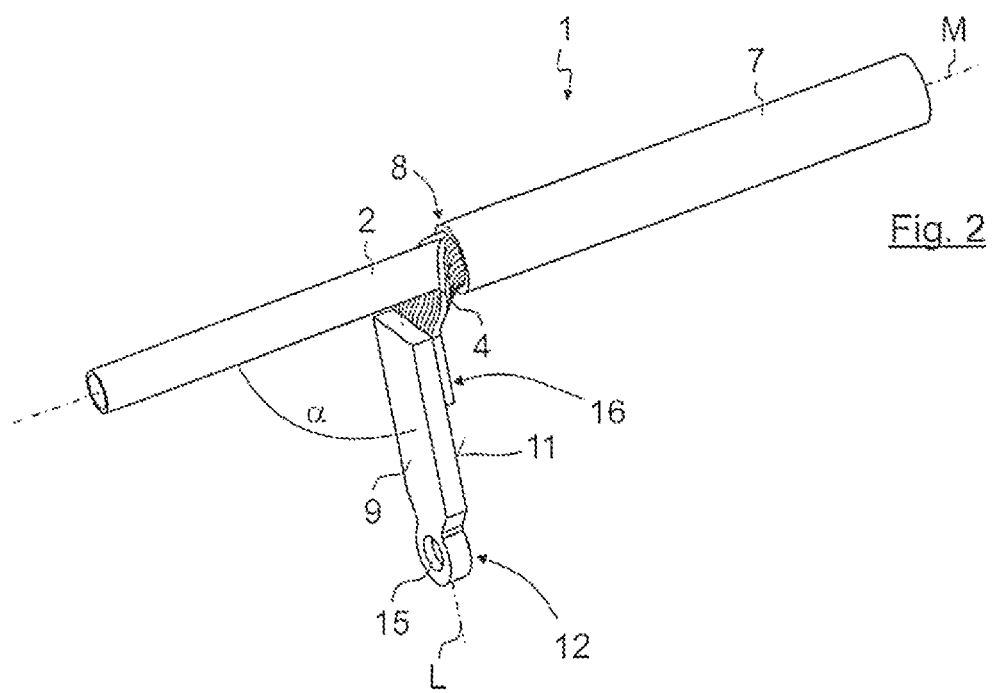
FIG. 2 is an assembled electrical cable with a cooling channel, an inner conductor, a cable sheath and a contact element according to a second exemplary embodiment, in a perspective view.

FIG. 1 shows an assembled electrical cable 1. The electrical cable 1 has a cooling channel 2 extending along a center axis M of the electrical cable 1. In the exemplary embodiments, the cooling channel 2 runs coaxially with the center axis M of the electrical cable 1 and is preferably flexible, in the manner of a hose, so as not to compromise the ability of the electrical cable 1 to bend. The cooling channel 2 is preferably formed from a non-conductive material, for example but not limited to, from a plastic. The cooling channel 2 can be connected to a cooling device 3 (indicated in FIG. 1 by a dashed line box), for example, but not limited to, of a vehicle. By means of the cooling channel 2, heat introduced into the electrical cable 1 on account of a high current flow can be dissipated advantageously. For this purpose, a coolant, in particular a cooling liquid, is preferably pumped through the cooling channel 2.

The electrical cable 1 also has at least one inner conductor 4, which runs along an outer surface of the cooling channel 2. In the exemplary embodiments according to FIGS. 1 to 7, a coaxially running inner conductor 4 is provided, which runs on the outer surface of the cooling channel 2. The inner conductor 4 is preferably formed as a stranded wire formed from a plurality of individual wires, which are distributed along the outer circumference of the cooling channel 2, as shown in the exemplary embodiments. The individual wires can be distributed individually or in groups along the outer circumference of the cooling channel 2.

Figure 8:
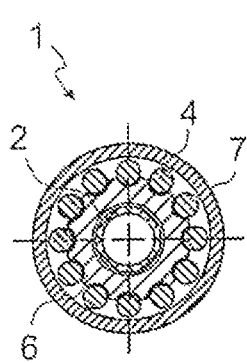
FIG. 8 is an electrical cable with a cooling channel according to a first embodiment shown in cross section.
Figure 9:
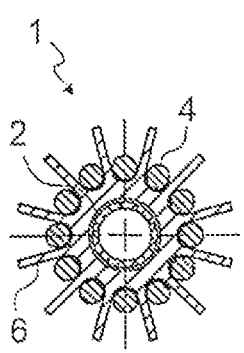
FIG. 9 is an electrical cable with a cooling channel according to a second embodiment as shown in FIG. 2 and shown in cross section.
Figure 10:
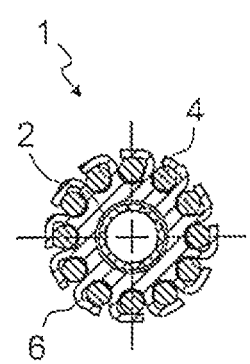
FIG. 10 is an electrical cable with a cooling channel according to a third embodiment as shown in FIG. 3 and shown in cross section.

In order to guide the at least one inner conductor 4 and/or the individual wires of the at least one inner conductor 4 along the outer surface of the cooling channel 2, the cooling channel 2 can optionally be profiled on its outer circumference. The cooling channel 2, however, can also be non-profiled, i.e. it can be smooth at its outer surface. It can also be provided that the cooling channel 2 may be enveloped at least in some sections by an inner conductor guide 6, which for example is as shown in cross section in FIGS. 8 to 10. For example, grooves according to FIG. 8, rib-like extensions according to FIG. 9, or claw-like guide means according to FIG. 10 can be provided on the outer surface of the inner conductor guide 6, or of the cooling channel 2.

The electrical cable 1 also has a cable sheath 7 guiding the inner conductor 4 and the cooling channel 2 within itself. The individual wires of the inner conductor 4 formed as a stranded wire are amalgamated in an angular segment, or circle segment K, at their exit point 8 from the cable sheath 7.

The assembled electrical cable 1 also has a contact element 9 for an electrical plug connector 10 (see FIG. 11 or FIG. 12), which is connected electrically and mechanically to at least a portion of the inner conductor 4 exposed from the cable sheath 7. In the exemplary embodiment the contact element 9 is connected to an end portion of the inner conductor 4; in principle, however, it can also be provided that the contact element 9 is connected to a middle portion of the inner conductor 4, which has been exposed accordingly. The contact element 9 is preferably an elongate component with flat geometry, which extends primarily in a longitudinal direction along a longitudinal axis L.

According to a first variant of the invention it is provided that the inner conductor 4 is connected in an integrally bonded manner to the contact element 9 (see FIGS. 1 and 2, 4 to 7 and 11). The inner conductor 4 is for this purpose, as shown in the exemplary embodiments, preferably connected to a surface 11 of the contact element 9 facing away from the cooling channel 2. In this case, the inner conductor 4 is preferably welded to the contact element 9, for example press-welded, resistance-welded or fusion-welded, in order to form the integrally bonded connection.

Figure 3:
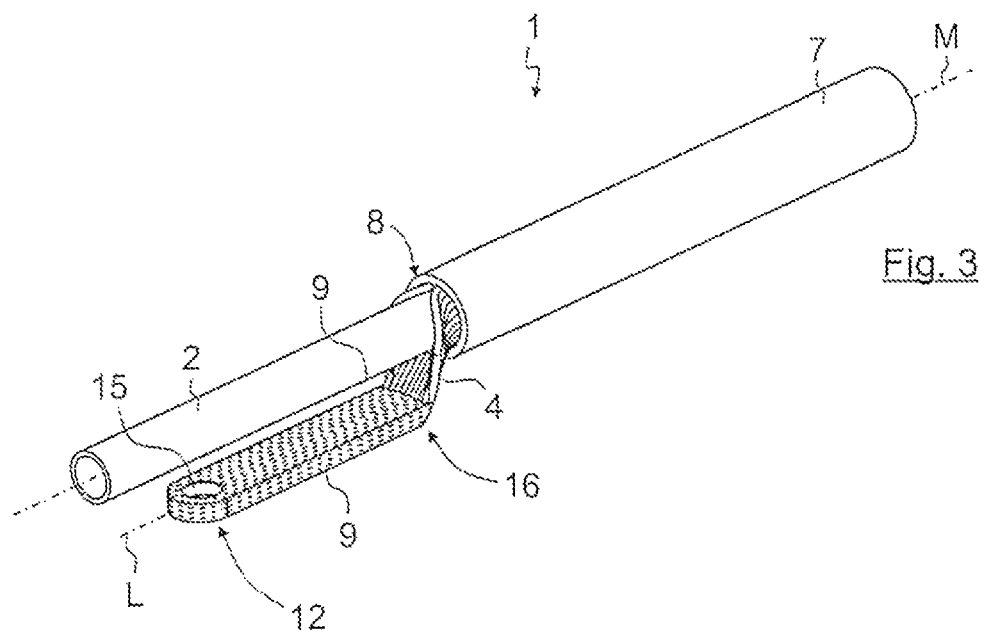
FIG. 3 is an assembled electrical cable with a cooling channel, an inner conductor, a cable sheath and a contact element according to a third exemplary embodiment, in a perspective view.

A second variant of the invention is shown in FIG. 3, in which the inner conductor 4 is compacted in a plate-like manner in order to itself form the contact element 9. A separate contact element 9 can thus be omitted. The inner conductor 4 can preferably be welded, for example press-welded, resistance-welded or fusion-welded, in order to form the contact element 9.

The invention is described in the exemplary embodiments substantially on the basis of the first variant (integrally bonded connection between inner conductor 4 and contact element 9). Features and advantages that are mentioned in this regard, however, can also be related to the second variant of the invention, provided this is not technically impossible.

The contact element 9 has a connection region 12 for connection to a mating contact element 13 (see FIGS. 4 to 7) for an electrical mating plug connector 14 (see FIG. 12) connectable to the electrical plug connector 10. The connection region 12 in the exemplary embodiment has a centering bore 15 for receiving, or for connection to, a sleeve-like or pin-like mating contact element 13. The connection region 16 is preferably arranged between the inner conductor 4 and the contact element 9 at an end of the contact element 9 opposite the connection region 12.

Since the inner conductor 4 is connected in an integrally bonded manner to the contact element 9, or itself forms the contact element 9, an orientation O (see FIG. 1) or a tilting of the contact element 9 in relation to its longitudinal axis L can advantageously be predefined or compensated. Furthermore, the position P (see FIG. 1) of the contact element 9 relative to the electrical cable 1, for example the position of the front end (for example of the connection region 12) of the contact element 9, can advantageously be predefined or corrected. Lastly, an outlet angle α (see FIG. 2) between the center axis M of the electrical cable 1 and the longitudinal axis L of the contact element 9 can also advantageously be predefined or corrected. The distance between the contact element 9 and the center axis M of the electrical cable 1 or between the contact element 9 and the cooling channel 2 can be advantageously predefined or corrected by the flexible connection according to the invention.

In particular it can be provided that the contact element 9 in respect of its longitudinal axis L is oriented parallel to the center axis M of the electrical cable 1 (outlet angle α equal to zero, see for example FIG. 1) or orthogonal (outlet angle α equal to 90°, see FIG. 2) to the center axis M of the electrical cable 1. However, in principle any outlet angle α can be provided.

It can be provided that the contact element 9 is distanced from the outer surface of the cooling channel 2. However, the contact element 9 preferably bears indirectly or directly against the outer surface of the cooling channel 2 in order to produce a heat-conductive connection to the cooling channel 2. In order to increase the contact area between the cooling channel 2 and the contact element 9 further still, it can additionally be provided that the contact element 9 has a contact face, in particular an indentation, in order to surround the outer circumference of the cooling channel 2 at least along a circumferential portion (for example partly annularly) or fully (annularly).

Figure 6:
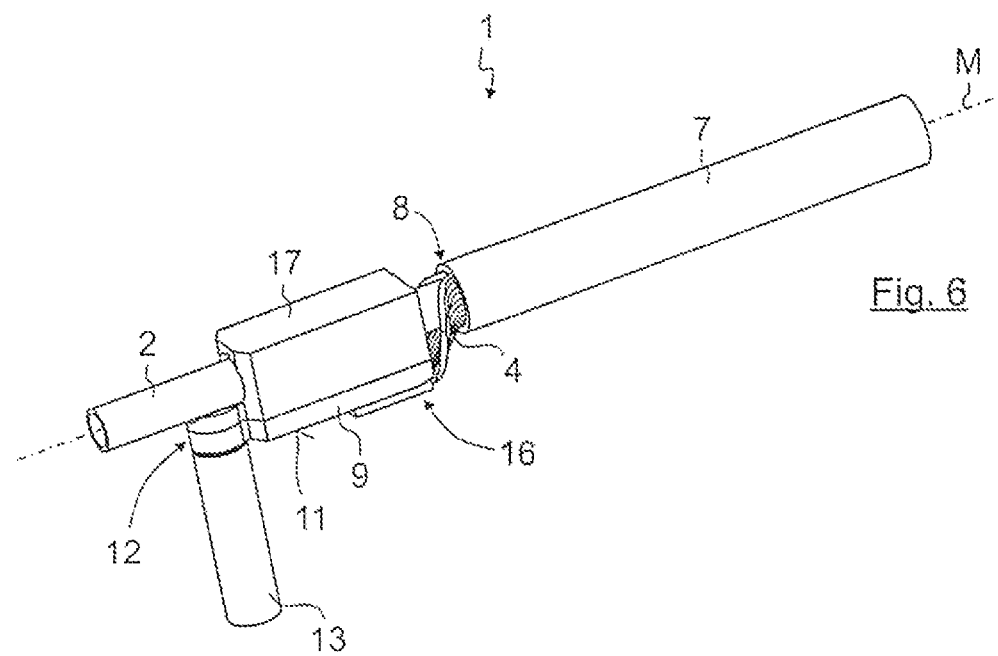
FIG. 6 is an assembled electrical cable with a cooling channel, an inner conductor, a cable sheath and a contact element according to a fifth exemplary embodiment, in a perspective view.
Figure 7:
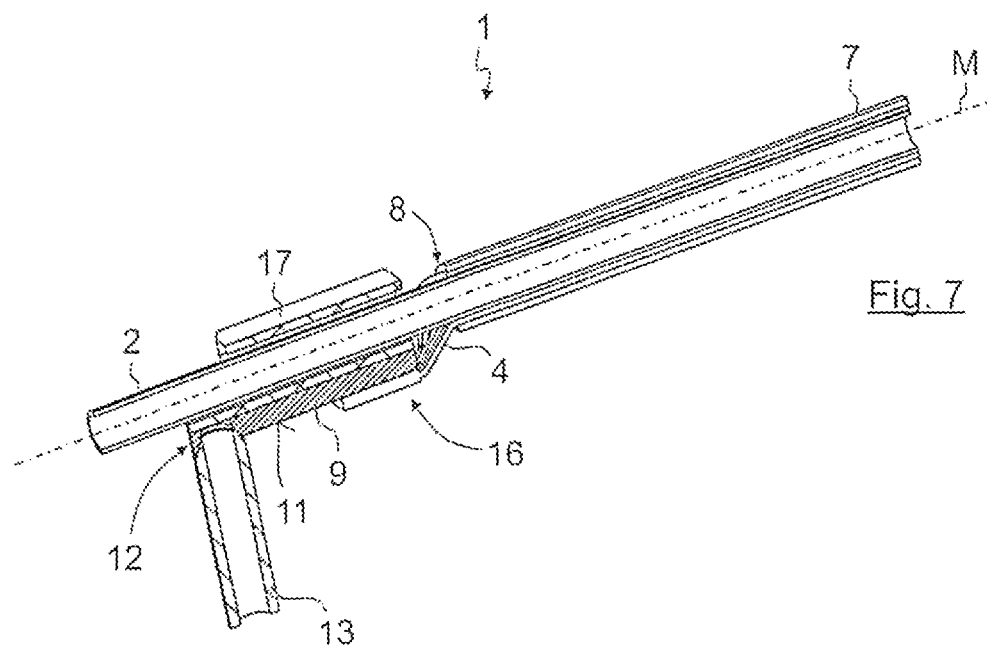
FIG. 7 is the assembled electrical cable shown in FIG. 6 in a sectional view.

It can also be provided that a connection element 17 rests between the contact element 9 and the cooling channel 2, as shown in FIGS. 4 to 7. The connection element 17 can preferably be formed from a plastic which is a good conductor of heat and can produce a heat-conductive connection between the cooling channel 2 and the contact element 9. In order to increase the contact area between the connection element 17 and the cooling channel 2 further still, it can be provided that the connection element 17 has a contact face, in particular an indentation, for example a trough-like, or channel-like, (part-annular) indentation, as shown in Figures FIGS. 4 and 5. However, it can also be provided that the connection element 17 has a through-bore, in order to surround the cooling channel 2 fully (annularly), as shown in FIGS. 6 and 7.

Figure 4:
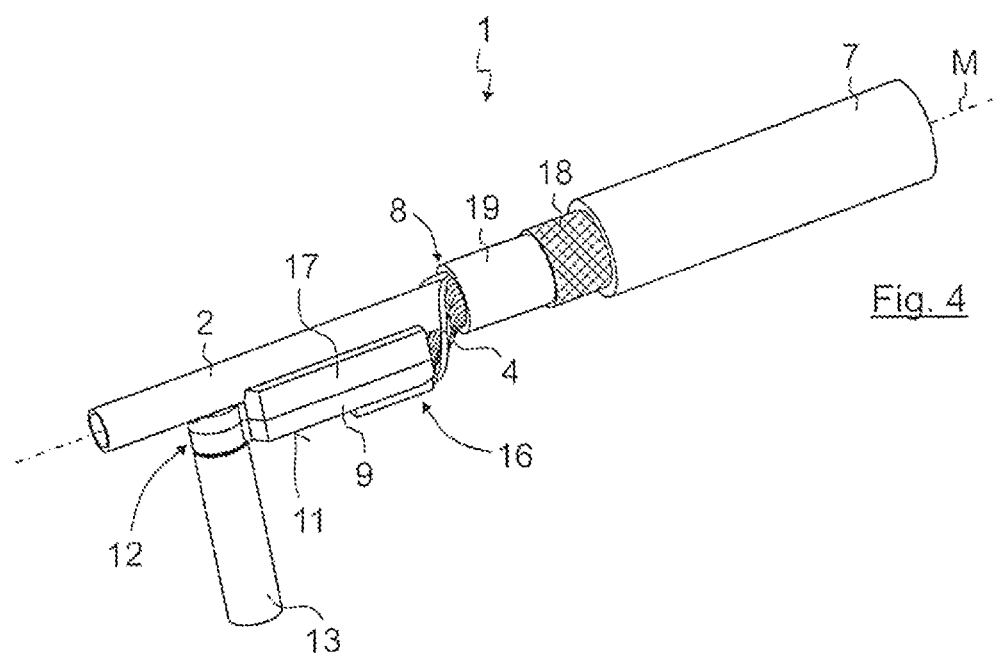
FIG. 4 is an assembled electrical cable with a cooling channel, an inner conductor, a cable sheath and a contact element according to a fourth exemplary embodiment, in a perspective view.
Figure 5:
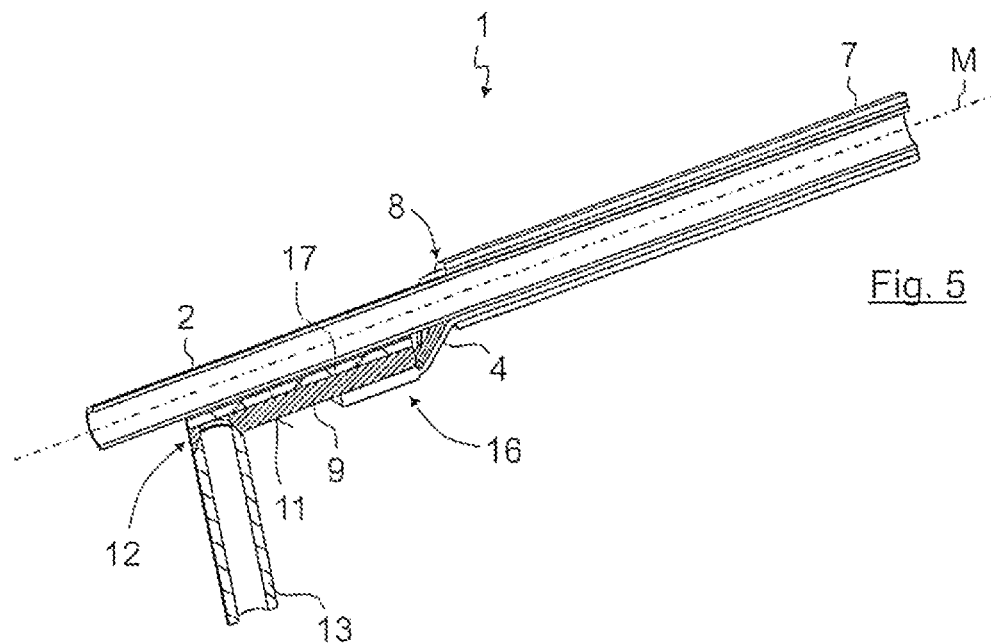
FIG. 5 is the assembled electrical cable shown in FIG. 4 in a sectional view.

In principle, the invention is suitable for use with an unshielded or with a shielded cable 1. A shielded cable 1 is shown in FIG. 4 purely by way of example, wherein the features can of course be transferred to all exemplary embodiments.

The shielded cable 1 has an outer conductor shield 18, which runs between the cable sheath 7 and the inner conductor 4 or the cooling channel 2 and which is electrically separated from the inner conductor 4 by an insulator 19. In order to connect the inner conductor 4 to the contact element 9 in an integrally bonded manner or in order to form the contact element 9 by the inner conductor 4, the inner conductor 4 can thus also be exposed from the insulator 19 and the outer conductor shield 18. In order to further improve the electromagnetic compatibility, it can be provided to connect the outer conductor shield 18 to a housing shielding (not shown) in the region of the contact element 9.

Figure 11:
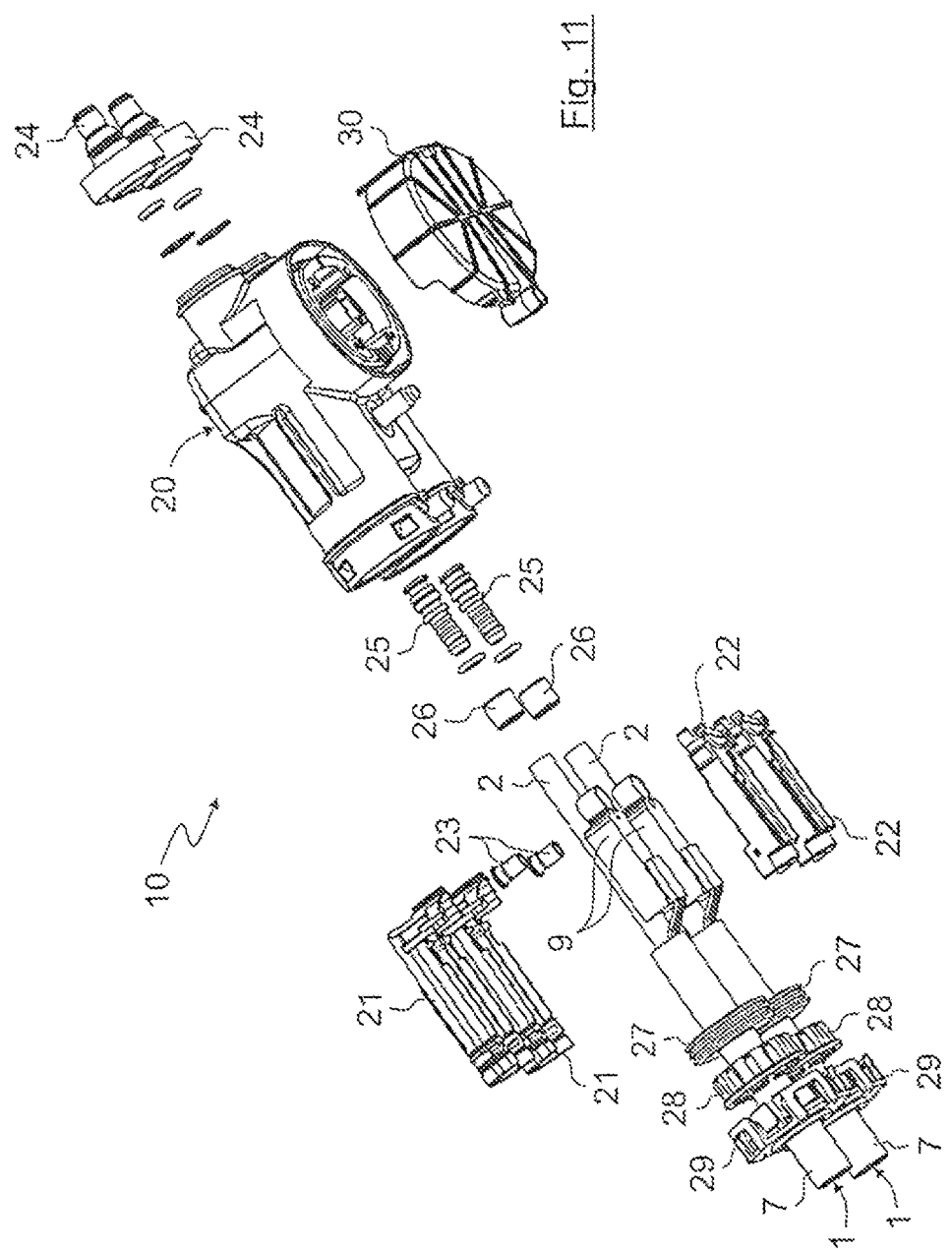
FIG. 11 is an exploded perspective view of an electrical plug connector with two assembled electrical cables showing the orientation and positioning of the various component.

An electrical plug connector 10 according to the invention is shown in an exploded view in FIG. 11 and has two of the assembled electrical cables 1 already described. Besides the components of the electrical cable 1 already described, the plug connector 10 has, inter alia, a housing module 20. The housing module 20 can have, in particular, an outer housing, for example made of a plastic. Furthermore, the plug connector 10 can have insulation shells 21, 22 for receiving the contact elements 9. In the exemplary embodiment of FIG. 11, two-part insulation shells 21, 22 are provided for receiving the contact elements 9 and consist of an upper insulation shell 21 and a lower insulation shell 22.

The electrical plug connector 10 shown by way of example in FIG. 11 has two assembled electrical cables 1, for example for connection to a positive and a negative terminal of a vehicle battery. In principle, however, an electrical plug connector 10 within the scope of the invention can have any number of assembled electrical cables 1, for example also only one electrical cable 1 or also more than two electrical cables 1, for example three electrical cables 1, four electrical cables 1, five electrical cables 1, or six electrical cables 1.

The electrical plug connector 10 shown merely by way of example can also have anti-contact sleeves 23 for the contact elements 9 in order to prevent unintentional contact with the contact elements 9, which will be live during subsequent operation.

The electrical plug connectors 10 can also have connection couplings 24 for connection to the cooling device 3. For connection of the connection coupling 24 to the cooling channel 2, a press-fit connection formed in particular of a hose connector 25 and a crimp sleeve 26 can be provided.

The electrical plug connector 10 can also have a corresponding line seal 27, a cable holder 28 and a termination cap 29 in order to prevent an infiltration of dust and moisture into the plug connector 10 at the entry points of the electrical cable 1 and/or in order to provide a sufficient cable retention for the cable 1.

A transport protection cap 30 can optionally be provided.

It is again noted that the shown electrical plug connector 10 is to be understood merely in an exemplary manner for use with the invention. In principle, the invention can be suitable for use with any electrical plug connector 10 (even for plug connectors with angled cable outlet), but in particular for use with an electrical plug connector 10 for high-voltage technology, preferably in the field of electro-mobility.

Figure 12:
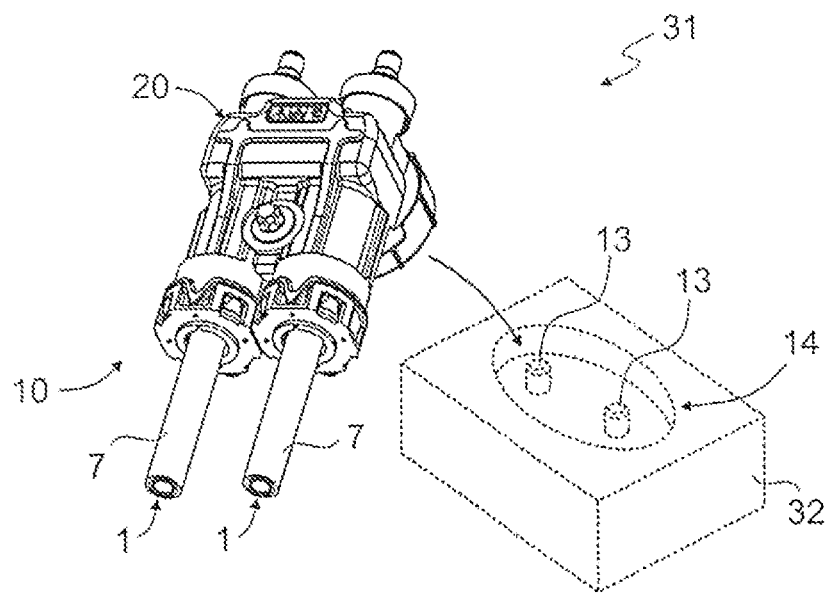
FIG. 12 is an electrical plug connection formed from an electrical plug connector and an electrical mating plug connector shown in a perspective view.

FIG. 12 shows an electrical plug connection 31 according to the invention, having an electrical plug connector 10, for example the plug connector 10 already described within the scope of FIG. 11, and a schematically indicated electrical mating plug connector 14 of an electrical device 32 in the form of a socket with two sleeve-like mating contact elements 13.

Figure 13:
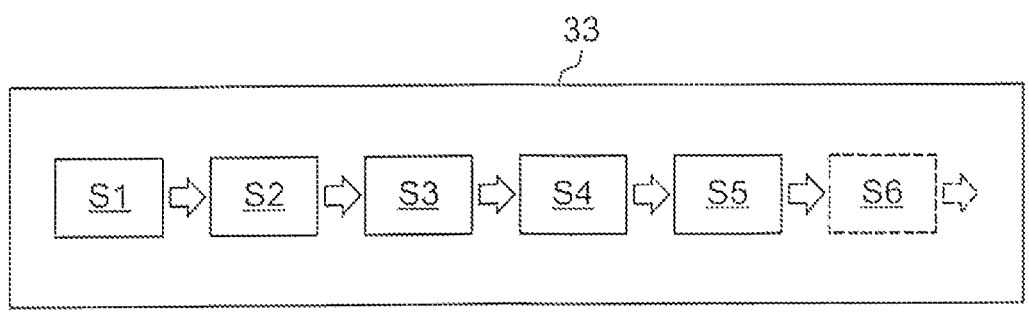
FIG. 13 is a block diagram showing the various steps of a method for assembling an electrical cable.

FIG. 13 shows a method according to the invention for assembling the electrical cable 1 on the basis of an exemplary process sequence. It should be mentioned in principle that the shown method sequence can also be extended by further method steps. Furthermore, method steps can be functionally subdivided further or also omitted.

In a first method step S1 it can firstly be provided that the electrical cable 1 provided in the form of a product sold in various lengths, such as but not limited to, by the meter is trimmed according to a predefined length.

In a following, second method step S2 it can be provided that the inner conductor 4 of at least one electrical cable end is exposed from the cable sheath 7 and, as applicable, from the insulator 19 and the outer conductor shield 18.

In a subsequent, third method step S3 it can be provided that the inner conductor 4, in particular an inner conductor 4 formed as a stranded wire, is fanned out.

In a following, fourth method step S4 it can be provided that the previously fanned-out inner conductor 4 is bundled in the angular segment or circle segment K.

In a following, fifth method step S5 it can be provided that the fanned-out and bundled inner conductor 4 is connected in an integrally bonded manner to a separate contact element 9, in particular is welded. Alternatively, it can be provided in the fifth method step S5 that the fanned-out and bundled inner conductor 4 is compacted in a plate-like manner to form a one-part contact element 9, preferably by a welding technique.

In an optional, sixth method step S6 it can be provided for example that further components of the electrical plug connector 10 are mounted on the electrical cable 1.

The method according to the invention, for example according to the described method sequence, can be carried out as a computer program product with program code means on a control device 33 of a cable assembly device.

Operation

Having described the structure of our Electrical Plug Connector, Connecting Element, and Printed Circuit Board Arrangement, its operation is briefly described.

A principal object of the present invention is to provide an assembled electrical cable (1) that defines a center axis (M), the assembled electrical cable (1) comprising: a cooling channel (2) that extends along the center axis (M) of the assembled electrical cable (1), the cooling channel (2) having an outer surface; at least one inner conductor (4), the at least one inner conductor (4) running along the outer surface of the cooling channel (2); a cable sheath (7) enclosing both the at least one inner conductor (4) and the cooling channel (2); a contact element (9) that is electrically and mechanically connected to the at least one inner conductor (4) at a portion of the at least one inner conductor (4) that is exposed from the cable sheath (7); and wherein the at least one inner conductor (4) is connected to the contact element (9) in an integrally bonded manner, or is compacted in a plate-like manner in order to form the contact element (9).

A further object of the present invention is to provide an assembled electrical cable (1) wherein the cooling channel (2) is coaxial with the center axis (M) of the assembled electrical cable (1).

A further object of the present invention is to provide an assembled electrical cable (1) and wherein the at least one inner conductor (4) is a stranded wire formed from a plurality of individual wires which are distributed individually, or in groups, about the outer surface of the cooling channel (2).

A further object of the present invention is to provide an assembled electrical cable (1) and wherein the individual wires of the stranded wire are amalgamated at a location where the individual wires of the stranded wire are exposed from the cable sheath (7).

A further object of the present invention is to provide an assembled electrical cable (1) and wherein the contact element has a surface that faces away from the coaling channel (2); and the at least one inner conductor (4) is connected to the surface of the contact element (9) that faces away from the cooling channel (2) in an integrally bonded manner.

A further object of the present invention is to provide an assembled electrical cable (1) and wherein the at least one inner conductor (4) is welded to the contact element (9), to form an integrally bonded connection.

A further object of the present invention is to provide an assembled electrical cable (1) and wherein the at least one inner conductor (4) is welded, preferably press-welded, resistance-welded or fusion-welded, to form the contact element (9).

A further object of the present invention is to provide an assembled electrical cable (1) and further comprising: an electrical mating plug connector (1); and the contact element (9) forms a connection region (12) that defines a centering bore (15), for connection to a mating contact element (13) of the electrical mating plug connector (14).

A further object of the present invention is to provide an assembled electrical cable (1) and wherein a portion of the contact element (9) bears directly against the outer surface of the cooling channel (2) to produce a heat-conductive connection to the cooling channel (2).

A further object of the present invention is to provide an assembled electrical cable (1) further comprising: a connection element (17) between the contact element (9) and the cooling channel; (2) and the connection element bears against the contact element (9) and against the outer surface of the cooling channel (2) to produce a heat-conductive connection between the cooling channel (2) and the contact element (9).

A further object of the present invention is to provide an assembled electrical cable wherein the connection element (17) has a contact face on a surface facing the cooling channel (2), and the contact face defines an indentation that is complimentary to the outer surface of the cooling channel (2) or which surrounds the cooling channel (2) about an outer circumference of the cooling channel (2) at least along a circumferential portion.

A further object of the present invention is to provide an assembled electrical cable (1) and further comprising: heat conducting paste, the heat conducting paste coating at least one of the at least one inner conductor (4) and the contact element (9).

A further object of the present invention is to provide an electrical plug connector (10) comprising: a housing module (20); and an assembled electrical cable (1) with a center axis (M), the assembled electrical cable (1), having, a cooling channel (2) extending along the center axis (M) of the assembled electrical cable (1), the cooling channel (2) having an outer surface, and at least one inner conductor (4) running along the outer surface of the cooling channel (2), and a cable sheath (7) guiding the at least one inner conductor (4) and the cooling channel (2) within the cable sheath (7), and an electrical plug connector (10) having a contact element (9), and the contact element (9) is electrically and mechanically connected to at least a portion of the at least one inner conductor (4) at a location where the at least one inner conductor (4) is exposed from the cable sheath (7), and wherein the at least one inner conductor (4) is connected to the contact element (9) in an integrally bonded manner, or is compacted in a plate-like manner in order to form the contact element (9).

A further object of the present invention is to provide an method for assembling an electrical cable (1) which has a cooling channel (2) that extends along a center axis (M), of the electrical cable (1), the method comprising the steps: providing an electrical cable (1) that defines the center axis (M), the electrical cable (1) having the cooling channel (2) and at least one inner conductor (4), and the cooling channel (2) and the at least one inner conductor (4) are circumferentially surrounded by a cable sheath (7); exposing at least a portion of the at least one inner conductor (4) from the cable sheath (7); providing a contact element (9); connecting the exposed portion of the at least one inner conductor (4) to the contact element (9); and wherein the connection between the exposed portion of the at least one inner conductor (4) to the contact element (9) is an integrally bonded connection.

A further object of the present invention is to provide an assembled electrical cable that defines a center axis (M), the assembled electrical cable (1) comprising: a cooling channel (2) that extends along the center axis of the assembled electrical cable (1), the cooling channel (2) having an outer surface; at least one inner conductor (4) that is a stranded wire formed from a plurality of individual wires which are distributed individually, or in groups, about the outer surface of the cooling channel (2); a cable sheath (7) enclosing the at least one inner conductor (4) and the cooling channel (2); a contact element (9) that is electrically and mechanically connected to the at least one inner conductor (4) at a portion of the at least one inner conductor (4) that is exposed from the cable sheath (7), and the individual wires of the stranded wire are amalgamated at a location where the individual wires of the stranded wire are exposed from the cable sheath (7); and wherein the at least one inner conductor (4) is connected to the contact element in an integrally bonded manner, or is compacted in a plate-like manner in order to form the contact element (9).

A further object of the present invention is to provide an assembled electrical cable (1) and wherein the at least one inner conductor (4) is press-welded or resistance-welded to form the integrally bonded connection.

A still further object of the present invention is to provide an assembled electrical cable and wherein the contact element (9) has a contact face on a surface facing the cooling channel (2), and the contact face defines an indentation that is complimentary to the outer surface of the cooling channel (2) or which surrounds the cooling channel (2) about an outer circumference of the cooling channel (2) at least along a circumferential portion.

An even still further object of the present invention is to provide an method for assembling an electrical cable which has a cooling channel (2) that extends along a center axis (M), of the electrical cable (1), the method comprising the steps: providing an electrical cable (1) that defines the center axis (M), the electrical cable (1) having the cooling channel (2) and at least one inner conductor (4), and the cooling channel (2) and the at least one inner conductor (4) are circumferentially surrounded a cable sheath (7); exposing at least a portion of the at least one inner conductor (4) from the cable sheath (7); and compacting the exposed portion of the at least one inner conductor (4) in a plate-like manner to form a contact element (9) in one part of the at least one inner conductor (4).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An assembled electrical cable that defines a center axis (M), the assembled electrical cable comprising:
    a cooling channel that extends along the center axis (M) of the assembled electrical cable, the cooling channel having an outer surface;
    at least one inner conductor, the at least one inner conductor running along the outer surface of the cooling channel;
    a cable sheath enclosing both the at least one inner conductor and the cooling channel;
    a contact element that is electrically and mechanically connected to the at least one inner conductor at a portion of the at least one inner conductor that is exposed from the cable sheath; and
    wherein the at least one inner conductor is connected to the contact element in an integrally bonded manner, or is compacted in a plate-like manner in order to form the contact element.

2. The assembled electrical cable as claimed in claim 1, and wherein the cooling channel is coaxial with the center axis (M) of the assembled electrical cable.

3. The assembled electrical cable as claimed in claim 1 and wherein the contact element has a surface that faces away from the cooling channel; and
    the at least one inner conductor is connected to the surface of the contact element that faces away from the cooling channel in an integrally bonded manner.

4. The assembled electrical cable as claimed in claim 1 and wherein the at least one inner conductor is welded, preferably press-welded, resistance-welded or fusion-welded, to form the contact element.

5. The assembled electrical cable as claimed in claim 1 and further comprising:
    an electrical mating plug connector; and
    the contact element forms a connection region that defines a centering bore, for connection to a mating contact element of the electrical mating plug connector.

6. The assembled electrical cable as claimed in claim 1 and further comprising:
    heat conducting paste, the heat conducting paste coating at least one of the at least one inner conductor and the contact element.

7. The assembled electrical cable as claimed in claim 1, and wherein the at least one inner conductor is a stranded wire formed from a plurality of individual wires which are distributed individually, or in groups, about the outer surface of the cooling channel.

8. The assembled electrical cable as claimed in claim 7, and wherein the individual wires of the stranded wire are amalgamated at a location where the individual wires of the stranded wire are exposed from the cable sheath.

9. The assembled electrical cable as claimed in claim 1 and wherein the at least one inner conductor is welded to the contact element to form an integrally bonded connection.

10. The assembled electrical cable as claimed in claim 9 and wherein the at least one inner conductor is press-welded or resistance-welded to form the integrally bonded connection.

11. The assembled electrical cable as claimed in claim 1 and wherein a portion of the contact element bears directly against the outer surface of the cooling channel to produce a heat-conductive connection to the cooling channel.

12. The assembled electrical cable as claimed in claim 11, and wherein the contact element has a contact face on a surface facing the cooling channel, and the contact face defines an indentation that is complimentary to the outer surface of the cooling channel or which surrounds the cooling channel about an outer circumference of the cooling channel at least along a circumferential portion.

13. The assembled electrical cable as claimed in claim 1 and further comprising:
    a connection element between the contact element and the cooling channel; and
    the connection element bears against the contact element and against the outer surface of the cooling channel to produce a heat-conductive connection between the cooling channel and the contact element.

14. The assembled electrical cable as claimed in claim 13, and wherein the connection element has a contact face on a surface facing the cooling channel, and the contact face defines an indentation that is complimentary to the outer surface of the cooling channel or which surrounds the cooling channel about an outer circumference of the cooling channel at least along a circumferential portion.

15. An electrical plug connector comprising:
    a housing module; and
    an assembled electrical cable with a center axis (M), the assembled electrical cable, having,
        a cooling channel extending along the center axis (M) of the assembled electrical cable, the cooling channel having an outer surface, and
        at least one inner conductor running along the outer surface of the cooling channel, and
        a cable sheath guiding the at least one inner conductor and the cooling channel within the cable sheath, and
        an electrical plug connector having a contact element, and
        the contact element is electrically and mechanically connected to at least a portion of the at least one inner conductor at a location where the at least one inner conductor is exposed from the cable sheath, and wherein
        the at least one inner conductor is connected to the contact element in an integrally bonded manner, or is compacted in a plate-like manner in order to form the contact element.

16. A method for assembling an electrical cable which has a cooling channel that extends along a center axis (M), of the electrical cable, the method comprising the steps:
    providing an electrical cable that defines the center axis (M), the electrical cable having the cooling channel and at least one inner conductor, and the cooling channel and the at least one inner conductor are circumferentially surrounded by a cable sheath;
    exposing at least a portion of the at least one inner conductor from the cable sheath;
    providing a contact element;
    connecting the exposed portion of the at least one inner conductor to the contact element; and wherein the connection between the exposed portion of the at least one inner conductor to the contact element is an integrally bonded connection.

17. An assembled electrical cable that defines a center axis (M), the assembled electrical cable comprising:
- a cooling channel that extends along the center axis of the assembled electrical cable, the cooling channel having an outer surface;
- at least one inner conductor that is a stranded wire formed from a plurality of individual wires which are distributed individually, or in groups, about the outer surface of the cooling channel;
- a cable sheath enclosing the at least one inner conductor and the cooling channel;
- a contact element that is electrically and mechanically connected to the at least one inner conductor at a portion of the at least one inner conductor element that is exposed from the cable sheath, and the individual wires of the stranded wire are amalgamated at a location where the individual wires of the stranded wire are exposed from the cable sheath; and
- wherein the at least one inner conductor is connected to the contact element in an integrally bonded manner, or is compacted in a plate-like manner in order to form the contact element.

18. A method for assembling an electrical cable which has a cooling channel that extends along a center axis (M), of the electrical cable, the method comprising the steps:
- providing an electrical cable that defines the center axis (M), the electrical cable having the cooling channel and at least one inner conductor, and the cooling channel and the at least one inner conductor are circumferentially surrounded by a cable sheath;
- exposing at least a portion of the at least one inner conductor from the cable sheath; and
- compacting the exposed portion of the at least one inner conductor in a plate-like manner to form a contact element in one part of the at least one inner conductor.

* * * * *